Oct. 5, 1926.

A. F. CALLISON

LOADING DEVICE FOR TRUCKS

Filed Dec. 27, 1923

WITNESSES
Louis Goodman
E. N. Lovewell

INVENTOR
Abner F. Callison

BY

ATTORNEY

Oct. 5, 1926.
A. F. CALLISON
LOADING DEVICE FOR TRUCKS
Filed Dec. 27, 1923
1,602,146
3 Sheets-Sheet 2
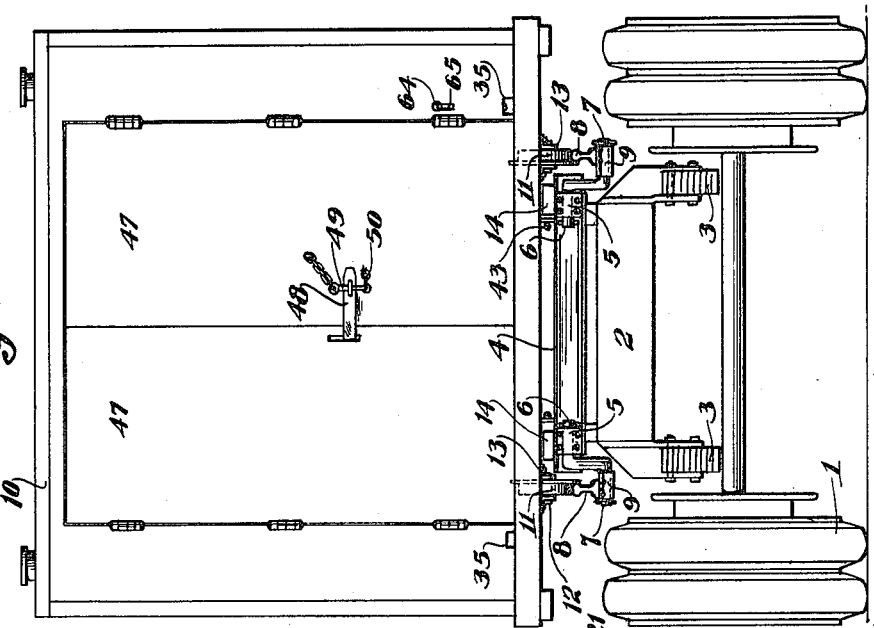
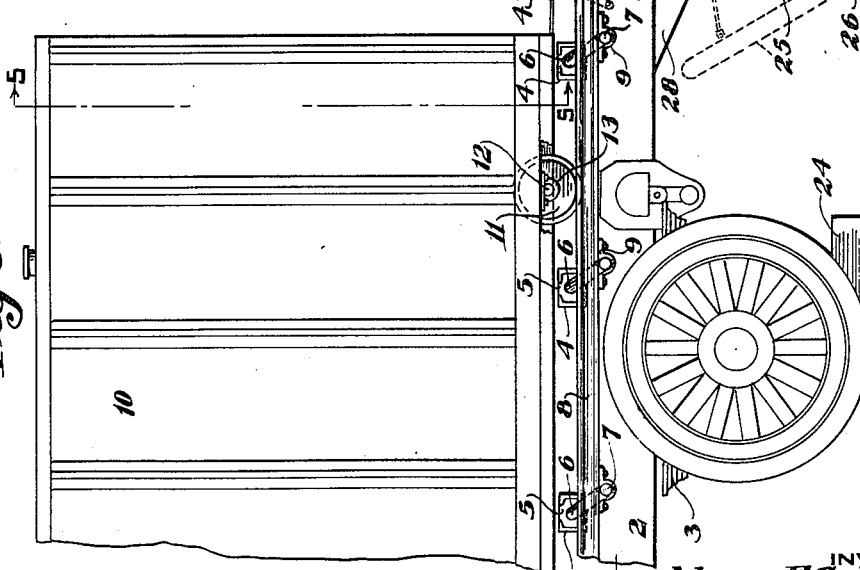
WITNESSES
Louis Goodman
E. N. Lovewell
INVENTOR
Abner F. Callison
BY 
ATTORNEY Oct. 5, 1926.
A. F. CALLISON
1,602,146
LOADING DEVICE FOR TRUCKS
Filed Dec. 27, 1923   3 Sheet —Sheet 3
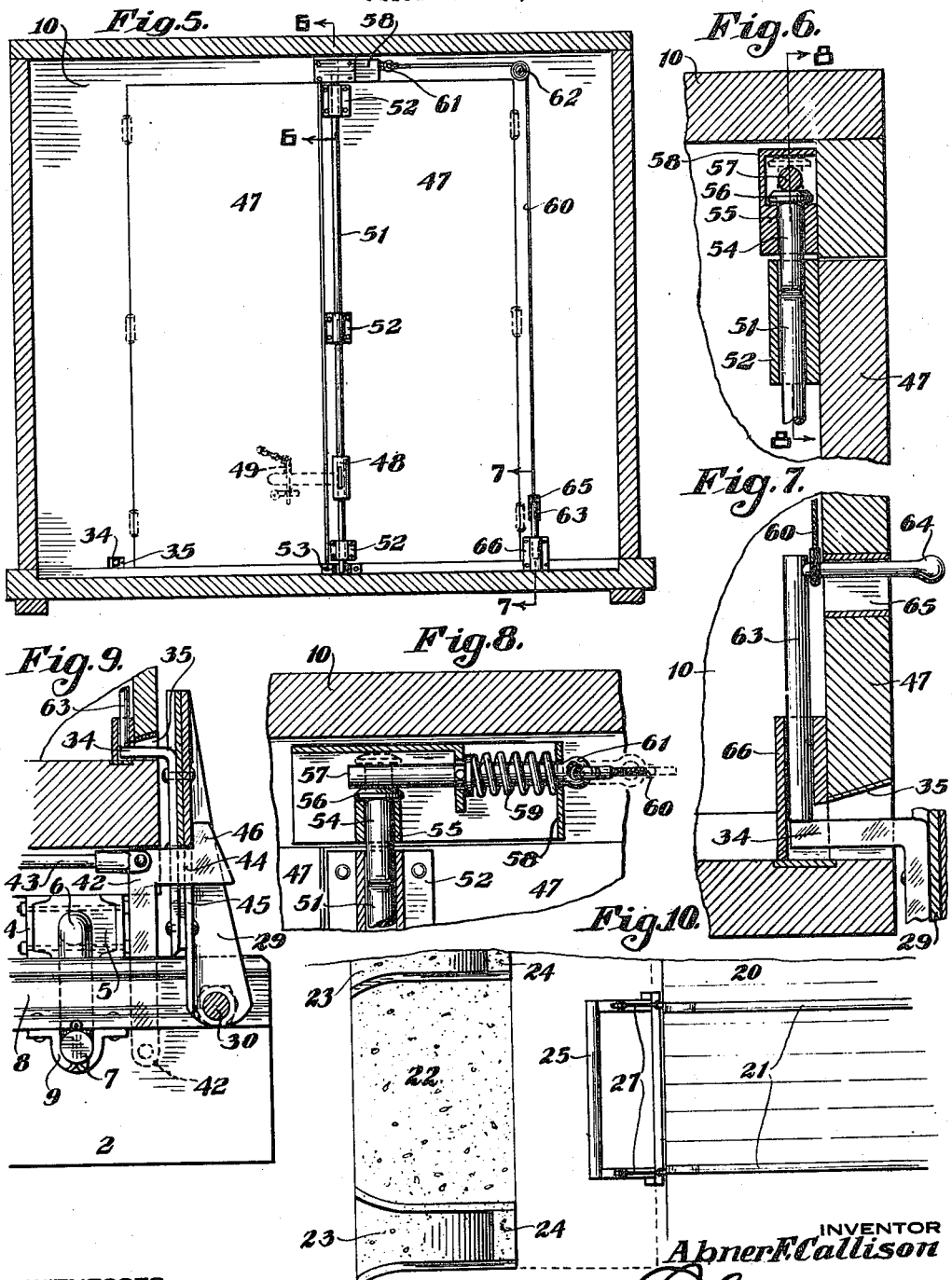
INVENTOR
Abner F. Callison
WITNESSES
Louis Goodman
E. N. Lovewell
BY
ATTORNEY

Patented Oct. 5, 1926.

1,602,146

UNITED STATES PATENT OFFICE.

ABNER F. CALLISON, OF PHILADELPHIA, PENNSYLVANIA.

LOADING DEVICE FOR TRUCKS.

Application filed December 27, 1923. Serial No. 683,040.

This invention relates to a device especially adapted to facilitate the loading and unloading of motor trucks, and other vehicles used for hauling freight and the like.

The primary object of the invention is to provide a loading device which constitutes a part of the regular equipment of the truck or other vehicle, and which is adapted to cooperate with a container of special construction containing the load, whereby said container may be filled at the ware house or freight house at the convenience of the workmen, and may be easily and quickly transferred to the truck, when the latter is available. Several containers will ordinarily be provided for each truck, so that one may be loaded or unloaded when another is being transported.

The invention also includes improved means for positioning the truck chassis while receiving the load, improved means for positioning the container on the truck chassis, and improved means for locking the container to the truck chassis, and at the same time locking the doors of the container.

Other objects and advantages of the invention will be apparent from the following detailed description taken in connection with the accompanying drawings, which illustrate one form of construction by means of which the same may be carried out.

In the drawings:

Figure 3 is a side elevation of the rear portion of the truck in position for unloading.

Figure 4 is a rear elevation of the truck and container with the rear gate removed, in order to show better the construction of the track operating mechanism.

Figure 5 is a transverse sectional view of the container taken on the line 5—5 of Figure 3.

Figure 6 is a detail sectional view taken on the line 6—6 of Figure 5.

Figure 7 is a detail sectional view taken on the line 7—7 of Figure 5.

Figure 8 is a detail sectional view taken on the line 8—8 of Figure 6.

Figure 9 is a detail sectional view showing the means for latching the end gate, and locking the rear end of the container to the truck.

Figure 10 is a plan view of the loading platform, and means for alining the truck.

Figures 1, 2:
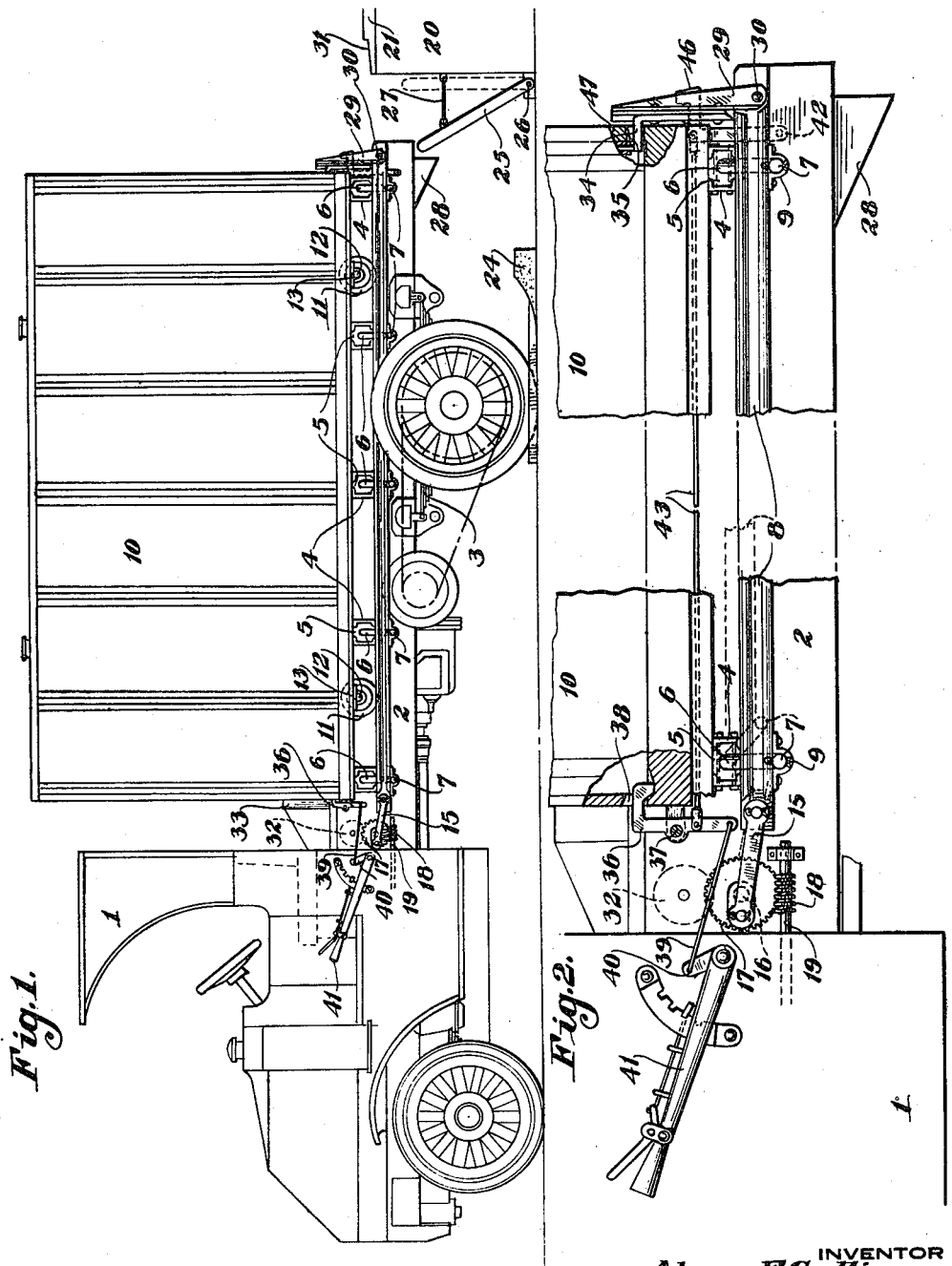
Figure 1 is a side elevation of a motor truck embodying the invention, with the container in loaded position.
Figure 2 is a similar view, enlarged, with parts broken away or shown in section.

The invention is illustrated in connection with a motor truck 1, having a chassis 2 supported at the rear by the usual springs 3, above the rear axle of the truck. A plurality of pairs of channel bars 4 are secured transversely across the upper side of the chassis, the bars of each pair being opposed to each other, and having bearing blocks 5 secured between them, in which are journaled shafts 6, having cranks 7 at their outer ends. A pair of rails 8 are journaled on the cranks 7 by means of journal boxes 9 secured to the undersides of the rails, one rail being supported at each side of the chassis.

The container 10, which may be of any suitable construction, is of a size to constitute the body of the truck, and is adapted to be loaded or unloaded in the ware house, and to be transferred bodily with its load to or from the truck. For this purpose, the container 10 is provided on its underside with a suitable number of flanged wheels 11, mounted on stub axles 12, which are journaled in boxes 13, suitably secured to the underside of the container. The wheels 11 are so arranged on the bottom of the container and are of such diameter that they will ride on the rails 8, when the latter are raised to the position shown in Figure 3, and the bottom of the container will be clear of the chassis, so that the container may be transferred to and from the truck, but when the rails 8 are swung downwardly to the position shown in Figures 1, 2 and 9, the container will be supported by longitudinal beams 14 on the transverse bars 4, and the wheels 11 will be lifted clear of the rails.

The rails are raised and lowered by rocking the shafts 6, as shown by the full and dotted line positions, respectively, in Figure 2. For effecting this movement, each of the rails 8 has a pitman 15 pivotally connected to its forward end, the forward end of the pitman being connected with a crank shaft 16, which is suitably journaled in rear of the engine and provided with a worm gear 17, driven by means of a worm 18 on the longitudinal shaft 19, which may be operated from the engine, or in any other suitable manner. Thus, as seen from Figure 2, when the crank shaft 16 is rotated from the position shown in full lines, through an arc of approximately 180°, the rails 8 will be carried rearwardly and upwardly by the cranks 7, so that the container 10 will swing clear of the channel bars 4, and be supported entirely by the wheels 11, which ride on the rails 8.

In order to transfer the container 10 with facility to and from the platform 20, the latter is also provided with rails 21 on which the wheels 11 are adapted to ride, and specially constructed means are provided for bringing the rails 8 of the truck into positive alinement with the rails 21. For this purpose, a steel and concrete guide block 22 is constructed at a suitable distance in front of the platform 20, and provided with converging channels 23 adapted to receive the wheels of the truck and to position the same laterally, so as to bring the rails 8 into the same vertical planes as the rails 21 on the platform. The channels 23 terminate in abutments 24, against which the truck wheels are adapted to rest when the rear end of the truck comes into contact with the front edge of the platform.

The rails 8 must also be brought into the same horizontal plane with the rails 21, and inasmuch as the resiliency of the truck springs 3 permit the horizontal position of the chassis to vary with the weight of the load, special means are provided for automatically lifting the chassis 2 sufficiently to relieve the tension of the springs 3, and to positively fix the horizontal position of the rails 8, before and during the loading or unloading of the container 10. For this purpose, a lifting member 25, Figures 1 and 2, is pivoted at its lower end, as at 26, adjacent the base of the platform 20, and is normally supported in a forwardly inclined position by a cable 27, so that its upper end is in position to be engaged by a depending abutment 28 at the rear end of the chassis 2 as the truck is backed up to the platform, and as the lifting member 25 is swung backwardly about its fulcrum 26, it lifts the rear end of the chassis, and positively lifts and supports the chassis with the rails 8 in the same horizontal plane with the rails 21. An end gate 29 is pivoted, as at 30, to the rear ends of the rails 8, and, when the truck is in position to be loaded, is adapted to be swung down against the cut away portions 31 of the platform rails, and to bridge the space between the latter and the truck rails 8. This end gate is swung upwardly after the container 10 is loaded, and is provided with means for retaining the latter in position on the truck, as will be hereinafter described.

When the truck and the rails 8 have been brought into position for loading, the container may be drawn over the rails 8 on the truck, by means of a suitable winch, as indicated at 32, until the front end of the container rests against a stop 33, formed on the front end of the truck. Inasmuch as the winch 32 forms no part of the invention, a detailed description thereof is not necessary. Usually, the driveway leading to the platform 20 will have a slight downward inclination, so that gravity will assist in unloading the container.

The end gate 29 has secured to its inner side a number of hooks 34, which, when the container 10 has been loaded and the end gate closed, extend forwardly and engage in recesses 35 formed above the rear end sill of the container, and thus retain the rear end of the container against movement relative to the truck. Corresponding hooks 36 are secured to a rock shaft 37 at the forward end of the truck, and are adapted to engage in holes 38 formed in the front end of the container, and thus hold it against movement relative to the truck. One of the hooks 36 is extended downwardly beyond the shaft 37, and its lower end is connected by a link 39 to the arm 40 of the lever 41, which is located within convenient reach of the driver of the truck. A plurality of L-shaped levers 42 are pivoted at the rear end of the chassis, and are connected by link rods 43 with the shanks of the corresponding hooks 36 below their fulcrums 37. These levers 42 have rearwardly extending portions 44 adapted to extend through slots 45 in the end gate and terminating in upturned toes 46, which are adapted to engage against the rear face of the end gate and lock the latter in its closed position, as best shown in Figure 9. Thus, when the container 10 has been loaded onto the truck and the end gate 29 closed, the lever 41 is moved forwardly to the position shown in Figures 1 and 2. This swings the hooks 36 rearwardly into the holes 38, while the rods 43 are moved forwardly to raise the lever 42, and to lock the end gate closed. Conversely, when the lever 41 is moved rearwardly, the hooks 36 are withdrawn from the holes 38, and at the same time the levers 42 are swung downwardly and rearwardly to release the end gate.

The rear end of the container 10 is provided with a pair of outwardly swinging doors 47, one of which closes over the other, and is retained by a hasp 48 and pin 49, which may be provided with a seal, as indicated at 50. Means are preferably provided, however, independent of the seal, by means of which the doors 47 may be locked, and may not be unlocked except when released by the driver. This locking means includes a bolt 51, slidably mounted in guides 52 on the inner side of the outer door, and movable by gravity to engage a keeper 53 located in the floor of the container. When the bolt 51 is in locking position, it is normally held positively in its lowermost position by a pin 54, slidably mounted in a guide member 55, and in alinement with the upper end of the bolt 51. The upper end of the pin 54 is provided with a head 56, which, as shown in Figure 8, may be engaged by a horizontal bolt 57, and held thereby in engagement with the upper end of the bolt 51, so as to positively prevent the latter from being withdrawn from the keeper 53. The bolt 57 is slidably mounted in a guide 58, and is normally held projected, as shown in Figure 8, by an expansile coiled spring 59. In order to draw the bolt 51 and unlock the doors 47, therefore, it is necessary to withdraw the bolt 57 against the resistance of the spring 59. Since these bolts are arranged on the inside of the container, this may only be done by means of a cable 60, which is secured to an eye 61 in the end of the bolt 57, and passes around a guide sheave 62, and is connected at its lower end to a bolt 63 having a pin 64 secured thereto, which extends outwardly through a slot 65 at the rear end of the container 10, and constitutes the only accessible means for releasing the bolt 51. Moreover, the bolt 63 is mounted in a guide 66, the lower end of which registers with one of the slots 35, as shown in Figure 7. When the gate 29 is closed, therefore, the hook 34 extends through the slot 35 into the guide 66, and into contact with the lower end of the bolt 63, so that the latter can not be lowered to release the bolt 51 until the gate 29 has been lowered, and this can not be done until the driver has released the same by swinging the lever 41 rearwardly.

After the gate 29 has been lowered, and either before or after the container 10 has been removed from the truck, the doors 47 may be opened. In doing this, the seal 50 is broken, the pin 49 withdrawn, and by means of the hasp 48, which is secured to the bolt 51, the latter may be raised with one hand, while with the other hand the bolt 63 is lowered by means of the pin 64, and the bolt 57 is withdrawn. When the bolt 51 has been raised, the pin 54 is raised to the position shown in dotted lines in Figure 8, and the bolt 57 may then be released, and will engage underneath the head 56 and retain the pin 54 in its upper position, so that the rod 51 is free to be raised whenever desired.

From the foregoing description, it will be understood that the container 10 may be entirely loaded within the ware house at the convenience of the workmen, or the various consignments may be placed therein as fast as they are packed. When the filling of the container has been completed, or when the truck is available, it may be backed up both horizontally and vertically with the rails 21 on which the container stands, it being understood that the shafts 6 have been swung rearwardly to the position shown in Figure 3. The container 10 may now be transferred to the truck in a few moments. The worm shaft 19 is then rotated to lower the rails, so that the container rests upon the longitudinal beams 14. The end gate 29 is then swung upwardly, and the lever 41 is swung forwardly. This last act serves to swing the hooks 36 rearwardly, and the levers 42 upwardly so as to lock the gate with the hooks 34 in engagement with the holes 35, so that the container is then locked against possible movement relatively to the truck, and the doors 47 are also positively locked until the driver has moved the lever 41 rearwardly to release the end gate 29.

The containers may be transferred bodily to and from a flat railroad car and transported thereon from one place to another. When this is done the flat car may be provided at each end with a stationary end gate about eighteen inches high, and along the sides of the car, there may be arranged series of drop gates, the length of each gate corresponding to the width of the containers and being held in upright position by short stakes set in the regular stake pockets.

While I have shown and described in considerable detail the specific features of the invention, it will be understood that a great many modifications may be made in the size, proportions and general arrangement of the various elements, as well as in the detailed construction of the same, and some of the features may be omitted entirely without departing from the invention when considered in its broadest aspect. It is, therefore, my desire to include all such modifications within the scope of the appended claims.

What is claimed is:

1. In a device of the character described, the combination with a wheel-supported vehicle, of a plurality of crank shafts mounted transversely thereof, a pair of parallel rails journaled on the cranks near opposite sides of the vehicle, a container adapted to be carried by the vehicle, wheels journaled in the bottom of the container near each side and having the same gage as the rails, and means for swinging the crank shafts in unison to raise the rails by parallel motion, so as to engage the wheels of the container and support the latter clear of the vehicle body, or to lower the rails until the container rests on the vehicle body with the container wheels clear of the rails.

2. In a device of the character described, the combination with a wheel-supported vehicle, of a plurality of crank shafts mounted transversely thereof, a pair of parallel rails journaled on the cranks near opposite sides of the vehicle, a container adapted to be carried by the vehicle, wheels journaled in the bottom of the container near each side and having the same gage as the rails, a countershaft mounted transversely of the vehicle in front of the rails and having a crank and pitman connection with each rail, and gearing for driving said countershaft to swing the rails on said cranks so as to engage the container wheels and support the container clear of the vehicle body, or to lower the rails until the container rests on the vehicle body with the container wheels clear of the rails.

3. In a device of the character described, the combination with a wheel-supported vehicle including a chassis having pairs of opposed transverse channel bars secured to its upper side, and bearing blocks secured between the respective bars of each pair, of a plurality of crank shafts journaled in said bearing blocks, a pair of longitudinal parallel rails journaled on the cranks near opposite sides of the vehicle but inside of the supporting wheels, a container adapted to be carried by the vehicle, wheels journaled in the bottom of the container near each side and having the same gage as the rails, and means for swinging the crank shafts to raise the rails by parallel motion so as to engage the wheels of the container and support the latter clear of the vehicle body, or to lower the rails until the container rests on the vehicle body with its wheels clear of the rails.

4. In a device of the character described, the combination with a wheel-supported vehicle including a chassis having pairs of opposed transverse channel bars secured to its upper side, and bearing blocks secured between the respective bars of each pair, of a plurality of crank shafts journaled in said bearing blocks, a pair of longitudinal parallel rails journaled on the cranks near opposite sides of the vehicle but inside of the supporting wheels, a container adapted to be carried by the vehicle, wheels journaled in the bottom of the container near each side and having the same gage as the rails, a countershaft mounted transversely of the vehicle in front of the rollers and having a crank and pitman connection with each rail, and gearing for driving said countershaft to swing said rails on the cranks so as to raise the rails by parallel motion to engage the wheels of the container and support the latter clear of the vehicle body, or to lower the rails until the container rests on the vehicle body with its wheels clear of the rails.

5. In a device of the character described, the combination of a wheel-supported vehicle, a pair of parallel rails carried thereby inside of the supporting wheels of the vehicle and capable of being raised and lowered, a container having wheels journaled in the bottom thereof which are adapted to ride on said rails when the latter are raised, and means for supporting said container on the vehicle with the container wheels spaced above the rails when said rails are lowered.

6. In a device of the character described, the combination of a wheel-supported vehicle, a pair of parallel rails carried thereby inside of the supporting wheels of the vehicle, means for raising and lowering said rails by a parallel motion, a container having wheels journaled in the bottom thereof which are adapted to ride on said rails when the latter are raised, means for supporting said container on the vehicle with the container wheels spaced above the rails when said rails are lowered, and means for securing said container against movement relative to the vehicle when the container is so supported.

7. In a device of the character described, the combination of a wheel-supported vehicle having a pair of rails mounted thereon so that they may be swung upwardly or downwardly in unison by a parallel motion, a container having wheels journaled in the bottom thereof near the sides of the container and having the same gage as the rails and adapted to ride on the latter when they are raised so as to support the container clear of the vehicle body, said container being adapted to rest on the vehicle body with the container wheels clear of the rails when the latter are lowered, and means operable by the driver from his seat when the container rests on the truck body for securing said container against movement relative to said body.

8. In a device of the character described, the combination of a vehicle having a pair of parallel rails capable of being raised and lowered, a container having wheels adapted to ride on said rails when the latter are raised, means for supporting said container on the vehicle with the wheels spaced above the rails when said rails are lowered, a rear end gate having hooks engageable with the rear end of the container to hold the same against movement relative to the vehicle, and hooks pivoted to the front end of the vehicle and engageable with the front end of the container to hold the same against movement relative to the vehicle when the rails are lowered.

9. In a device of the character described, the combination of a vehicle having a pair of parallel rails capable of being raised and lowered, a container having wheels adapted to ride on said rails when the latter are raised, means for supporting said container on the vehicle with the wheels spaced above the rails when said rails are lowered, a rear end gate hinged to open downwardly and having hooks engageable, when the gate is closed, with the rear end of the container to hold the same against movement relative to the vehicle, and means for locking the gate closed and simultaneously securing the front end of the container against movement relative to the vehicle.

10. In a device of the character described, the combination with a vehicle having a chassis, of a container adapted to constitute the complete load of the vehicle, said vehicle having a rear end gate hinged to open downwardly, said gate having hooks engageable with the rear end of the container when the gate is closed, hooks pivoted to the front end of the vehicle and engageable with the front end of the container and cooperating with the first-mentioned hooks to hold said container on the vehicle, and means for moving the front hooks into engagement with the container and simultaneously locking the rear gate in closed position.

11. In a device of the character described, the combination of a vehicle, a container constituting with its contents the complete load of the vehicle, a rear end gate hinged to the vehicle so as to open downwardly and having hooks engageable, when the gate is closed, with the rear end of the container, means for locking the gate closed, and means actuated simultaneously with said locking means and cooperating with said rear hooks to secure the container against movement with respect to the vehicle.

12. In a device of the character described, the combination of a vehicle having a pair of parallel rails capable of being raised and lowered, a container having wheels adapted to ride on said rails when the latter are raised, means for supporting said container on the vehicle with the wheels spaced above the rails when said rails are lowered, a rear end gate hinged to the vehicle and having hooks engageable with the rear end of the container, hooks pivoted to the front end of the vehicle and cooperating with the first mentioned hooks for retaining said container against movement relative to the vehicle, means operable by the driver from his seat for locking the gate closed, said container having doors, and means for locking the doors, said locking means being releasable only when the gate is open.

13. A device of the character described comprising, in combination, a vehicle, a closed container supported thereby and provided at its rear end with hinged doors, a door bolt inside the container for locking the doors, means normally operable to positively prevent the withdrawal of the door bolt to unlock the doors, and means controllable by the driver from his seat to release or prevent the release of the first-mentioned means, said first-mentioned means and the door bolt being operable by a person in rear of the vehicle, only when so released, to unlock the door.

14. In a device of the character described, the combination of a vehicle, a container constituting a complete load for the vehicle, a rear end gate hinged to the rear end of the vehicle so as to open downwardly, hooks rigidly secured to said gate and engageable when the gate is closed with the rear end of the container to secure the same to the vehicle, means operable by the driver from his seat for locking the gate and simultaneously securing the front end of the container to the vehicle, said container having doors, and means for locking said doors, said locking means being releasable only when the gate is open.

In testimony that I claim the foregoing as my own, I have hereto affixed my signature.

ABNER F. CALLISON.